United States Patent [19]

Meikle et al.

[11] Patent Number: 5,655,951
[45] Date of Patent: Aug. 12, 1997

[54] METHOD FOR SELECTIVELY RECONDITIONING A POLISHING PAD USED IN CHEMICAL-MECHANICAL PLANARIZATION OF SEMICONDUCTOR WAFERS

[75] Inventors: Scott G. Meikle, Boise, Id.; Lucky F. Marty, Scottsdale, Ariz.

[73] Assignee: Micron Technology, Inc., Boise, Id.

[21] Appl. No.: 535,991

[22] Filed: Sep. 29, 1995

[51] Int. Cl.$^6$ ................................................ B24B 1/00
[52] U.S. Cl. .................. 451/56; 451/41; 451/443; 451/444
[58] Field of Search .................. 451/56, 443, 444, 451/285, 287, 41

[56] References Cited

U.S. PATENT DOCUMENTS

| | | | |
|---|---|---|---|
| 2,662,519 | 12/1953 | Metzger | 451/443 |
| 3,090,171 | 5/1963 | Stimson | 451/443 |
| 4,200,395 | 4/1980 | Smith et al. | 356/356 |
| 4,203,799 | 5/1980 | Sugawara et al. | 156/601 |
| 4,358,338 | 11/1982 | Downey et al. | 156/627 |
| 4,367,044 | 1/1983 | Booth, Jr. et al. | 356/357 |
| 4,377,028 | 3/1983 | Imahashi | 29/574 |
| 4,422,764 | 12/1983 | Eastman | 356/357 |
| 4,513,538 | 4/1985 | Wolters et al. | 451/287 |
| 4,640,002 | 2/1987 | Phillips et al. | 29/574 |
| 4,660,980 | 4/1987 | Takabayashi et al. | 356/357 |
| 4,879,258 | 11/1989 | Fisher | 437/225 |
| 5,081,051 | 1/1992 | Mattingly et al. | 437/10 |
| 5,216,843 | 6/1993 | Breivogel et al. | 51/131.1 |
| 5,220,405 | 6/1993 | Barbee et al. | 356/357 |
| 5,272,117 | 12/1993 | Roth et al. | 437/228 |
| 5,297,365 | 3/1994 | Nishioka et al. | 451/41 |
| 5,324,381 | 6/1994 | Nishiguchi | 156/297 |
| 5,384,986 | 1/1995 | Hirose et al. | 451/444 |
| 5,456,627 | 10/1995 | Jackson et al. | 451/11 |
| 5,461,007 | 10/1995 | Kobayashi | 437/225 |
| 5,486,131 | 1/1996 | Cesna et al. | 451/56 |

*Primary Examiner*—James G. Smith
*Assistant Examiner*—Dona C. Edwards
*Attorney, Agent, or Firm*—Seed and Berry LLP

[57] ABSTRACT

The present invention is a method for selectively reconditioning a polishing pad used in chemical-mechanical planarization of semiconductor wafers. A desired polishing rate is selected based upon a set of operating parameters for a specific wafer. The set of operating parameters may be different from those of previously planarized wafers. A desired change in the thickness of the pad material is estimated for reconditioning the pad to achieve a desired polishing rate. The estimate of the desired change in pad thickness is based upon the desired polishing rate and a predetermined correlation between wafer polishing rates and changes in pad thickness per conditioning cycle. A layer of material having a thickness substantially equal to the desired change in thickness is then removed from the planarizing surface to create a new planarizing surface.

15 Claims, 6 Drawing Sheets

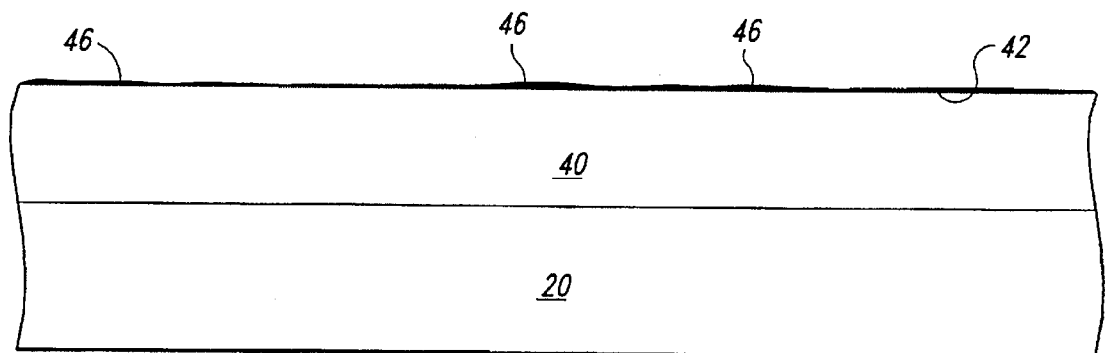
Fig. 1
(Prior Art)
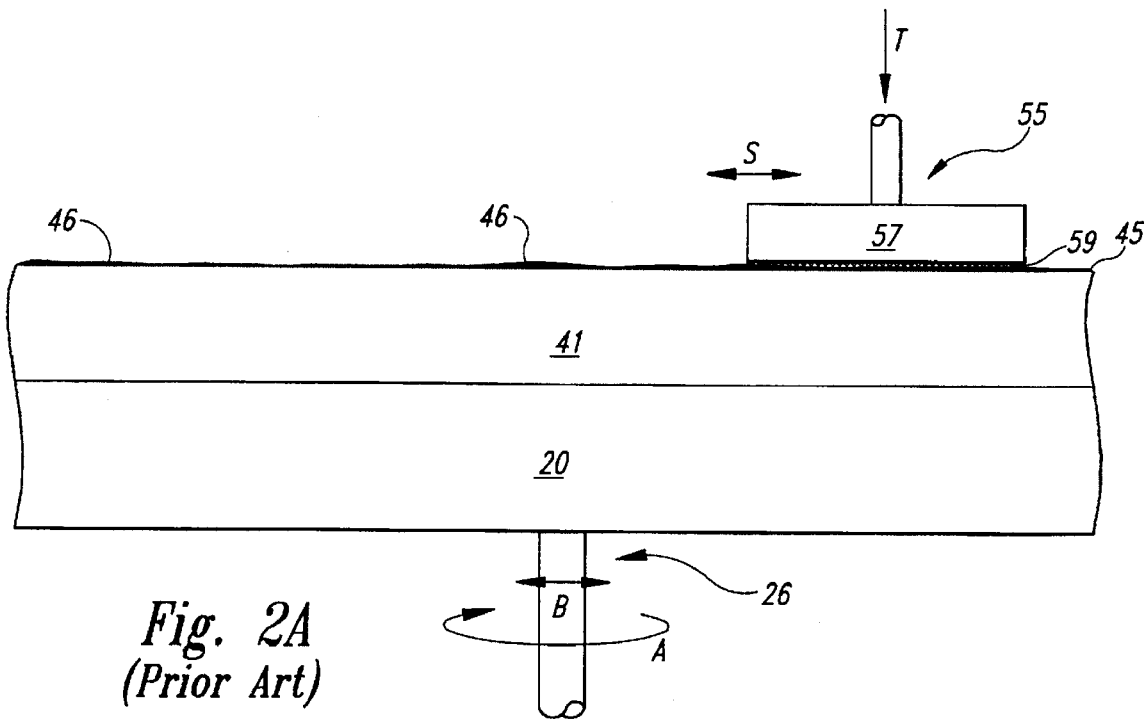
Fig. 2A
(Prior Art)
Fig. 2B
(Prior Art)

CHANGE IN PAD THICKNESS PER CONDITIONING CYCLE (μm/cycle)

METHOD FOR SELECTIVELY RECONDITIONING A POLISHING PAD USED IN CHEMICAL-MECHANICAL PLANARIZATION OF SEMICONDUCTOR WAFERS

TECHNICAL FIELD

The present invention relates to a method for selectively reconditioning polishing pads used in making semiconductor devices with chemical-mechanical planarization processes.

BACKGROUND OF THE INVENTION

Chemical-mechanical planarization ("CMP") processes are frequently used to planarize dielectric layers in the production of ultra-high density integrated circuits. In typical CMP processes, a wafer is pressed against a slurry on a polishing pad under controlled chemical, pressure, velocity, and temperature conditions. Slurry solutions generally contain small, abrasive particles of silica or alumina that mechanically remove the surface of the wafer, and chemicals that react with the materials of the dielectric layers to enhance the removal of the molecules on the surface of the wafer. The polishing pad is generally a planar pad made from a relatively soft, porous material such as blown polyurethane.

CMP processes must accurately planarize the dielectric layer to a desired endpoint. Several hunched microelectronic devices are typically fabricated on a single wafer by depositing layers of various materials on the wafer, and manipulating the wafer and other layers of material with photolithographic, etching, and doping processes. In order to manufacture ultra-high density integrated circuits, CMP processes must provide a highly planar surface so that the geometries of the component parts of a die may be accurately positioned across the full surface of the wafer. Thus, it is important to accurately planarize the wafers to a desired endpoint across the whole wafer.

In the competitive semiconductor industry, it is also highly desirable to maximize the throughput of the CMP processes to produce accurate, planar surfaces as quickly as possible. The throughput of CMP processes is a function of several factors including the rate at which the thickness of the wafer decreases as it is being planarized (the "polishing rate"), and the ability to accurately stop the CMP process at a desired endpoint. A high polishing rate generally results in a greater throughput because it requires less time to planarize a wafer. Accurately stopping the CMP process at a desired endpoint is also important to maintaining a high throughput because the thickness of the dielectric layer must be within an acceptable range; if the thickness of the dielectric layer is not within its acceptable range, the wafer must be re-planarized until it reaches a desired endpoint. Such re-planarization of a wafer significantly reduces the throughput of current CMP processes, so it is highly desirable to stop the CMP process at a desired endpoint on the first attempt.

One problem with current CMP processes is that it is difficult to accurately stop the CMP process at a desired endpoint. Current CMP processes predict when the dielectric layer has been planarized to its desired endpoint by estimating the planarization time required to remove the desired amount of material. The planarization time itself is also estimated by using the average polishing rate of another wafer that was polished sometime before the contemporaneous wafer. The polishing rate, however, is a function of the several operating parameters including: (1) the downward pressure of the wafer against the slurry and pad; (2) the relative velocity between the wafer and the pad; (3) the chemical and abrasive characteristics of the slurry; (4) the condition of the pad; (5) the temperature of the slurry; and (6) the type of planarizing tool (e.g., single head or double head). Some of the operating parameters may change from one wafer to another in a controlled manner to improve the planarity of the dielectric layer or the throughput of the process. Other operating parameters may change in an uncontrolled manner. The polishing rate will accordingly vary from one wafer to another resulting in an inaccurate estimate of the planarization time and stopping point for the contemporaneous wafer. Therefore, it would be desirable to develop a method that provides better control of the polishing rate of a wafer to more accurately estimate the planarization time for a contemporaneous wafer.

Another problem with current CMP processes is that polishing rates change for a number of reasons, and it is difficult to determine which one of the variables must be corrected to bring the polishing rate back to a desired level. The downward pressure of the wafer and the relative velocity between the wafer and the pad are relatively easy to measure and indicate to the operator. The characteristics of the slurry, the temperature of the wafer, and the polishing condition of the pad, however, are difficult to ascertain. For example, polishing pads degrade over time and become less effective after planarizing a wafer because materials from the wafer and the slurry fill the pores and grooves on the surface of the pads and reduce the pads' ability to abrade subsequent wafers. Polishing pads are consequently "conditioned" to bring them back to an acceptable state for planarizing a wafer by abrading the built-up materials on their surfaces with a diamond-embedded stone. Accordingly, if the polishing rate drops for a reason other than the pressure or velocity, the operator must guess whether the drop was caused by the condition of the pad, the effectiveness of the slurry, or the temperature of the wafer. Therefore, it would be desirable to develop a method that generally eliminates the condition of the pad as a factor which would cause a change in the polishing rate of the pad.

One way to provide a better estimate of the planarizing time is to condition the pad after or while each wafer is polished. U.S. Pat. No. 5,216,843 discloses a pad conditioning process that better estimates the planarization time of pads that have concentric grooves on their planarizing surfaces. Such a pad conditioning process scores small, spaced-apart radial grooves in the pad and any material that builds-up on the surface of the polishing pad while a wafer is being polished. This pad conditioning process avoids changing the thickness of its pad to prevent mining the concentric grooves. The grooved pad conditioning process of U.S. Pat. No. 5,216,843, however, is not useful on flat pads because it requires large, permanent grooves in the pad to facilitate slurry transport. Moreover, without the large, permanent grooves, the grooved pad conditioning process will produce uncontrollable polishing rates in flat pads. Therefore, it would be desirable to develop a method for selectively reconditioning a flat pad after each wafer to provide a desired polishing rate.

SUMMARY OF THE INVENTION

The inventive method selectively reconditions a planarizing surface of a polishing pad used in chemical-mechanical planarization of semiconductor wafers. A desired polishing rate is selected based upon a set of operating parameters for a specific wafer. The set of operating parameters may be different from those of previously planarized wafers. A desired change in the thickness of the pad material for appropriately reconditioning the pad to achieve the desired polishing rate is estimated based upon a predetermined correlation between wafer polishing rates and changes in pad thickness per conditioning cycle. A layer of material having a thickness substantially equal to the desired change in pad thickness is then removed from the planarizing surface to create a new planarizing surface.

Another embodiment of the invention is a method of chemical-mechanical planarization of a semiconductor wafer against a planarizing surface of a polishing pad. A desired thickness of material is selectively removed from across substantially all of the planarizing surface of the polishing pad before the wafer is planarized. The desired change in thickness of pad material is estimated by selecting a desired polishing rate, and correlating the desired polishing rate with a predetermined relationship between polishing rates and changes in pad thickness per conditioning cycle. The desired change in pad thickness may be different from one wafer to the next to adapt to different operating parameters and provide a desired polishing rate for each set of parameters. The wafer is pressed against the planarizing surface of the polishing pad in the presence of a slurry, and at least one of the pad or the wafer is moved with respect to one another.

In still another embodiment of the invention, a desired change in thickness of pad material is selectively removed from across substantially all of the planarizing surface of the polishing pad before a wafer is planarized to bring the pad into a desired condition. The desired change in thickness of pad material is estimated by selecting a desired polishing rate, and correlating the desired polishing rate with a predetermined relationship between polishing rates and changes in pad thickness per conditioning cycle. Again, the desired change in pad thickness may be different from one wafer to another to adapt to different operating parameters and provide a desired polishing rate for each set of parameters. The wafer is pressed against the planarizing surface of the polishing pad in the presence of a slurry, and at least one of the pad or the wafer is moved with respect to one another. The actual change in pad thickness is measured after the removing step. A wafer polishing rate is then estimated based upon the actual change in pad thickness and a predetermined correlation between wafer polishing rates and changes in pad thickness per conditioning cycle. The estimated polishing rate is compared to the desired polishing rate, and the planarization time is adjusted if there is a sufficient difference between the estimated polishing rate and the desired polishing rate. The pressing and moving steps are stopped at the planarization time.

BRIEF DESCRIPTION OF THE DRAWINGS

FIG. 1 is a schematic cross-sectional view of a polishing pad used in chemical-mechanical planarization processes with a degraded planarizing surface.

FIG. 2A is a schematic cross-sectional view of a grooved polishing pad used in chemical-mechanical planarization processes being conditioned by a grooved pad conditioning method in accordance with the prior art.

FIG. 2B is a cross-sectional view of the grooved polishing pad of FIG. 2A.

DETAILED DESCRIPTION OF THE INVENTION

Figure 3:
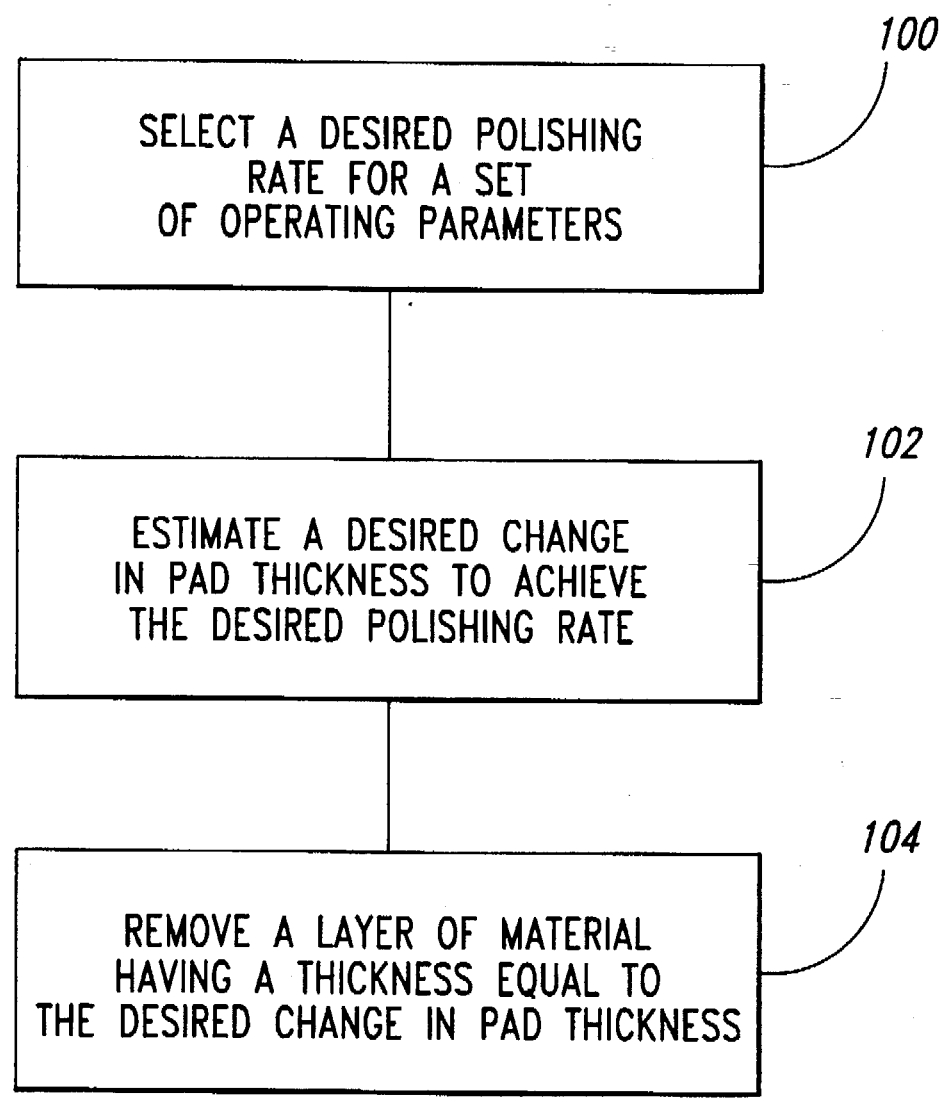
FIG. 3 is a flowchart illustrating a method in accordance with the invention.

The present invention provides a method fox selectively reconditioning a polishing pad to provide better control of the polishing rate of a wafer, better estimates of the polishing rate of a specific wafer just before it is planarized, and better uniformity of the planarized surface. One central aspect of the invention is the discovery of a straight line correlation between wafer polishing rates and changes in pad thickness caused by conditioning the pad. Another important aspect of the invention is selectively removing a layer of material that has a desired thickness from the planarizing surface of a pad to recondition the pad and to achieve a desired wafer polishing rate for virtually any given set of operating parameters. Unlike current polishing pad conditioning processes, the present invention brings the polishing pad into a desired condition that is selected to adapt to different operating parameters from one wafer to another. By bringing the pad into a desired condition for a different set of operating parameters, the polishing rate of the wafer can be controlled to provide better estimates of the planarization time for the different operating parameters. The steps of the method of the invention and the structure of the apparatus are described in greater detail below in FIGS. 3–9, in which like reference numbers refer to like parts throughout the various figures.

FIG. 1 illustrates a used polishing pad 40 with a degraded planarizing surface 42. The polishing pad 40 is positioned on a movable platen 20 and moved with respect to a wafer (not shown in FIG. 1) while the wafer is pressed against the planarizing surface 42. After a wafer is planarized, the planarizing surface 42 becomes degraded for a number of reasons, one of which is believed to be that a layer of waste material 46 remains on the planarizing surface 42. The waste material 46 smoothes out the textured planarizing surface 42, which degrades the performance of the pad 40. Thus, after enough waste material 46 builds up on the planarizing surface 42 of the polishing pad 40, the polishing pad 40 will not be in a state in which it can effectively polish semiconductor wafers.

FIG. 2A and 2B illustrate a conditioning method for a grooved pad 41 that removes a minimal amount of material across the surface of the grooved polishing pad 41. A pad conditioning apparatus 55 with a head 57 is positioned adjacent to the waste material 46 on the planarizing surface 45 of the grooved polishing pad 41. A number of diamond-tipped teeth 59 extend downwardly from the lower surface of the head 57. The pad conditioning apparatus 55 is moved downwardly in the direction of arrow T so that the diamond-tipped teeth 59 of the head 57 pierce the waste material 46 and the planarizing surface 45. The platen 20 is then rotated by an actuator 26 in a direction indicated by arrow A, and the pad conditioning apparatus 55 is swept across the planarizing surface 45 of the pad 41 in a direction indicated by arrow S. The diamond-tipped teeth 59 of the pad conditioning apparatus 55 score microchannels on the planarizing surface 45 of the pad 41 without removing the pad material that forms the tops of the grooves. Grooved pad conditioning processes do not remove a layer of pad material across the whole planarizing surface because to do so would damage the grooves.

FIG. 3 illustrates a method of selectively reconditioning a polishing pad in accordance with the invention. The first step of the invention 100 is to define a desired polishing rate based upon a set of operating conditions for a specific wafer. The set of operating conditions is generally defined by several factors, some of which are: (1) the number of heads on the planarizing machine; (2) the pattern density on the wafer; (3) the type of dielectric material; (4) the amount of material that is to be removed from the wafer; (5) the down-force on the wafer; and (6) the condition of the pad. The set of operating conditions may be the same or different from those of previous wafers that were polished with the same polishing pad. The second step 102 is to estimate a desired change in thickness of the pad for reconditioning the pad to achieve the desired polishing rate. The estimate of the desired change in pad thickness is based upon the desired polishing rate and a predetermined correlation between wafer polishing rates and changes in pad thickness per conditioning cycle. The third step 104 is to remove a layer of material having a thickness equal to the desired change in pad thickness from across substantially all of the planarizing surface to create a new planarizing surface.

Figure 4:
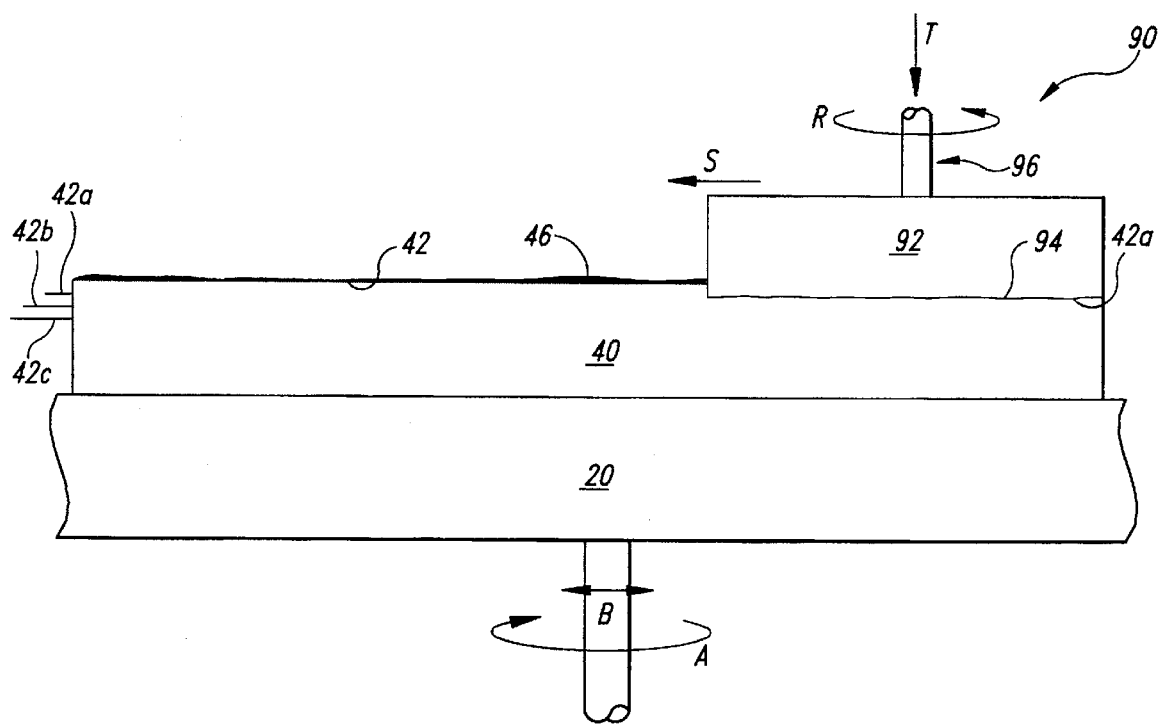
FIG. 4 is a schematic cross-sectional view of a polishing pad and a micromachining device for use in connection with removing material on the planarizing surface of a polishing pad in accordance with the invention.

FIG. 4 schematically illustrates a polishing pad 40 being reconditioned in accordance with a method of the invention. A micromachining device 90 is used to selectively remove a layer of material from the planarizing surface 42 that results in a desired change in pad thickness for reconditioning the pad. The micromachining device 90 has a disk 92 with an abrasive surface 94 for engaging the planarizing surface 42 of the polishing pad 40. The abrasive surface 94 is preferably made from diamonds embedded into the disk, but other abrasive materials such as ceramics may also be used effectively in the invention. In operation, the abrasive surface 94 is pressed against the planarizing surface 42 of the polishing pad 40 by a downward force in the direction indicated by arrow T, and an actuator 96 rotates the disk 92 as indicated by arrow R. The disk 92 is then moved across the polishing pad 40 in a direction as indicated by arrow S. The abrasive surface 94 removes the pad material until it reaches a first intermediate level 42(a) in the pad 40. The polishing pad 40 will accordingly have a new planarizing surface at the first intermediate level 42(a). After a wafer is planarized on the new planarizing surface at the first intermediate level 42(a), the polishing pad 40 is reconditioned again to a second intermediate level 42(b) to create another new planarizing surface. The thickness of the layer of material that is removed from the planarizing surface 42 may be between 0.5 and 10 µm, and is typically between 2.0 and 4.0 µm. Accordingly, the pad is micromachined after each wafer is planarized to produce a new planarizing surface at an intermediate depth within the pad.

The desired polishing rate is selected to quickly produce a highly planar wafer or dielectric layer for given a set of operating parameters of a specific wafer. The desired polishing rate for a current wafer may be selected to be substantially the same as previous wafers even though the operating parameters for the current wafer are different. Similarly, a different polishing rate may be selected when the operating parameters are the same as those of previous wafers. Thus, the present invention provides better control over the polishing rate compared to conditioning methods for grooved pads.

Figure 5:
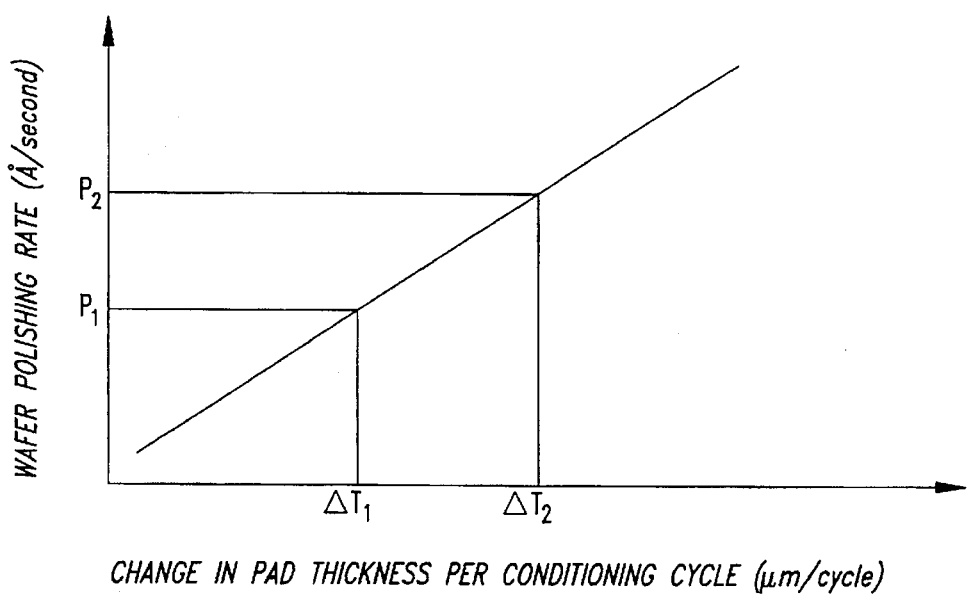
FIG. 5 is a graph illustrating the straight line correlation between wafer polishing rates and the change in pad thickness per conditioning cycle.

The desired change in pad thickness is estimated by first determining a correlation between wafer polishing rates and changes in pad thickness per conditioning cycle under a number of different operating conditions. FIG. 5 illustrates the general straight-line relationship between wafer polishing rates and changes in pad thickness per conditioning cycle. The polishing rate of a wafer is directly related to the thickness of the layer of pad material that is removed during a conditioning cycle such that a change in pad thickness of $\Delta T_1$ µm/cycle corresponds to a wafer polishing rate of $P_1$ Å/s, and a change in pad thickness of $\Delta T_2$ µm/cycle corresponds to a wafer polishing rate of $P_2$ Å/s. Once a desired polishing rate for a wafer has been selected, the desired change in pad thickness may be estimated by simply inserting the desired wafer polishing rate into the equation defined by the straight-line relationship. The slope and intercept of the straight-line relationship between wafer polishing rates and the change in pad thickness per conditioning cycle will vary according to the operating parameters, such as the types of slurry and planarizing tools. Accordingly, to accurately estimate the desired change in thickness of the pad for various sets of operating parameters, tests may be performed to develop the specific straight-line relationship between wafer polishing rates and the change in pad thickness per conditioning cycle for each set of operating parameters that are to be used.

Figure 6:
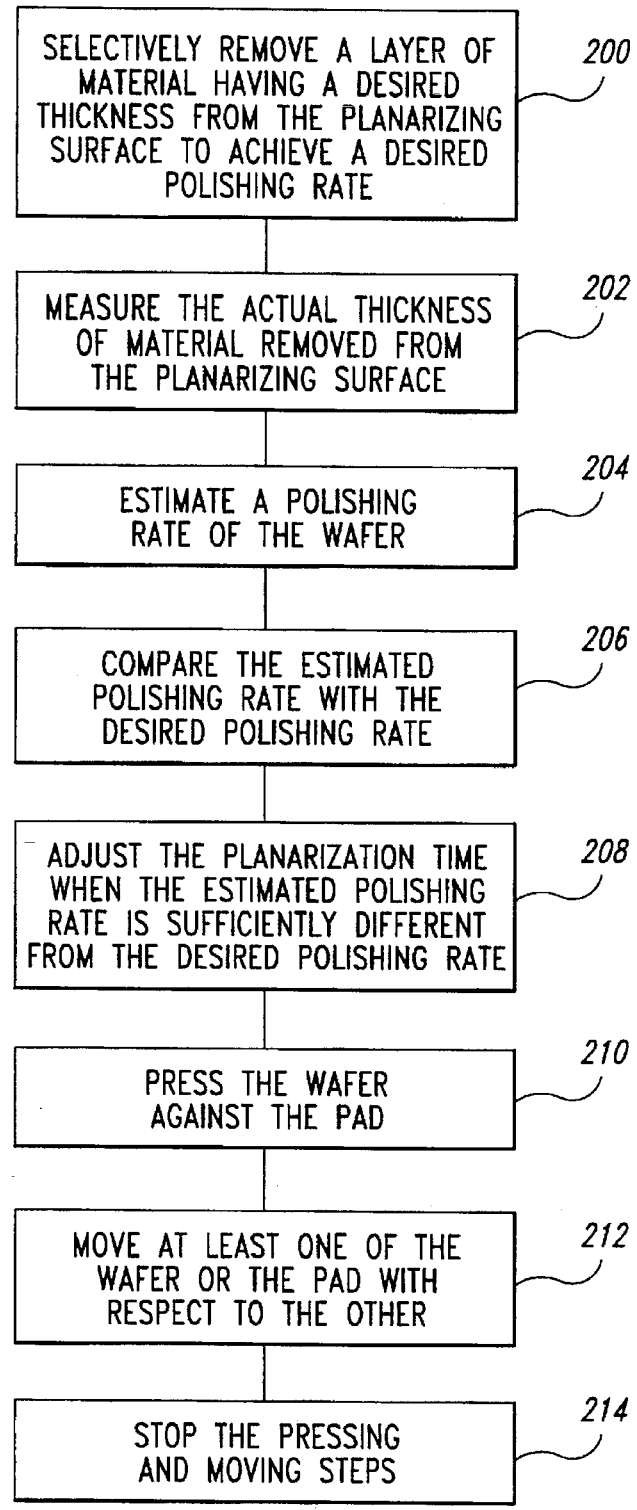
FIG. 6 is a flowchart illustrating another method in accordance with the invention.

FIG. 6 illustrates a method of planarizing a semiconductor wafer that further enhances the ability to stop the CMP process at a desired end point. The first step 200 is to selectively remove a desired thickness of pad material from across substantially all of the planarizing surface of the pad, which changes the thickness of the pad and brings the pad into a desired condition that provides a desired polishing rate. The step 202 is to measure the actual thickness of material removed from the planarizing surface during the removing step. The step 204 is to estimate the actual polishing rate of the wafer based upon the actual change in thickness of the pad and a predetermined correlation between wafer polishing rates and changes in pad thickness per condition cycle. The step 206 is to compare the desired polishing rate with the estimated actual polishing rate, and the step 208 is to adjust the planarization time when the estimated polishing rate is sufficiently different from the desired polishing rate. The step 210 is to press the wafer against the pad in the presence of a slurry, and the step 212 is to move at least one of the pad or the wafer with respect to each other. The step 214 is to stop the pressing and moving steps at the planarization time. The step 200 of removing a desired thickness of pad material from the planarizing surface of pad is performed as described above with respect to FIGS. 3–5. The steps of 202–214 are described as follows with respect to FIGS. 5 and 7–9.

Figure 7:
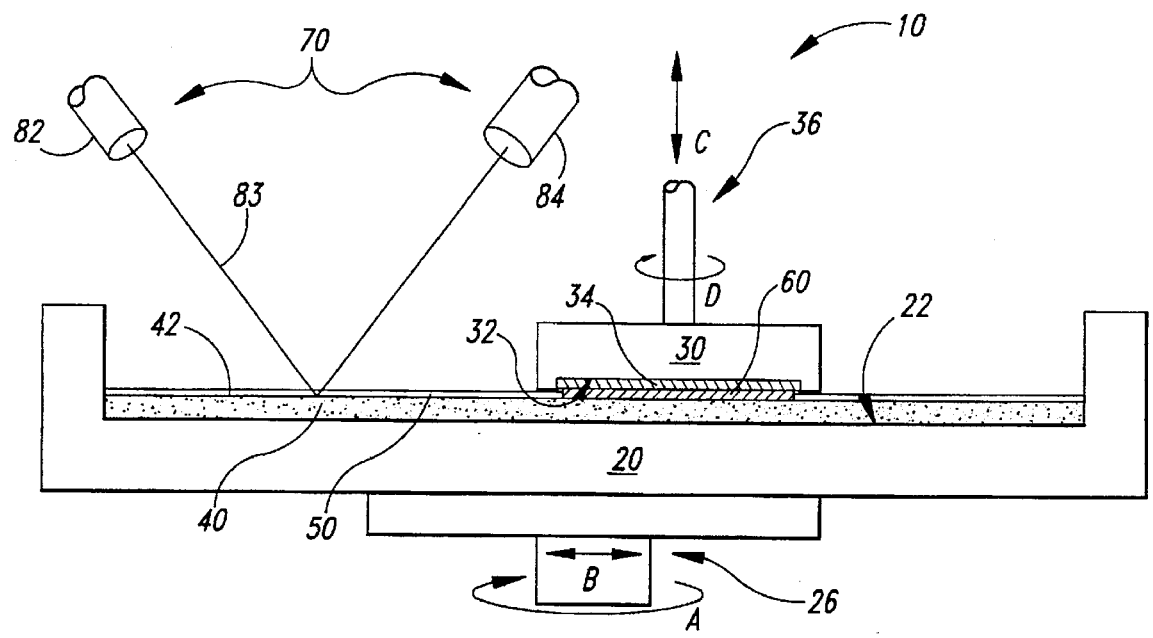
FIG. 7 is a schematic cross-sectional view of a chemical-mechanical planarization device used in the method of FIG. 6.

FIG. 7 illustrates a wafer polisher 10 with a platen 20, a wafer carrier 30, a polishing pad 40, and a measuring device 70. The platen 20 has a planarizing surface 22 upon which the polishing pad 40 is positioned. A drive assembly 26 rotates the platen 20 as indicated by arrow A and/or reciprocates the platen 20 back and forth as indicated by arrow B. The motion of the platen 20 is imparted to the pad 40 because the polishing pad 40 frictionally engages the planarizing surface 22 of the platen 20.

The wafer carrier 30 has a lower surface 32 to which a wafer 60 may be attached. A resilient pad 34 may be positioned between the wafer 60 and the lower surface 32 to frictionally attach the wafer 60 to the wafer carrier 30. The wafer carrier 30 may be a weighted, free-floating wafer carrier, or it may have an actuator assembly 36 attached to it for imparting axial and rotational motion as indicated by arrows C and D, respectively.

A measuring device 70 engages at least one area on the polishing pad 40 to measure the change in the thickness of the pad 40. The measuring device 70 is preferably a laser position sensor or a laser interferometer with an emitter 82 and a detector 84. The emitter 82 shoots a laser beam 83 onto the planarizing surface 42, which reflects off of the planarizing surface 42 of the polishing pad 40 and travels back up to the detector 84. Other measuring devices such as a capacitance meter that measures the capacitance of the polishing pad 40 or a stylus are also within the scope of the invention. The measuring device 70 preferably engages the pad 40 after the pad 40 is conditioned by removing a desired thickness of material from the planarizing surface 42, but it may also engage the surface of the pad while the wafer is being polished. The measuring device 70 preferably accurately measures the change in thickness of the pad 40 to within 0.2 μm. Accordingly, the measuring device 70 provides in-situ measurement of the change in thickness of the polishing pad 40 each time after the pad 40 is conditioned.

Figure 8:
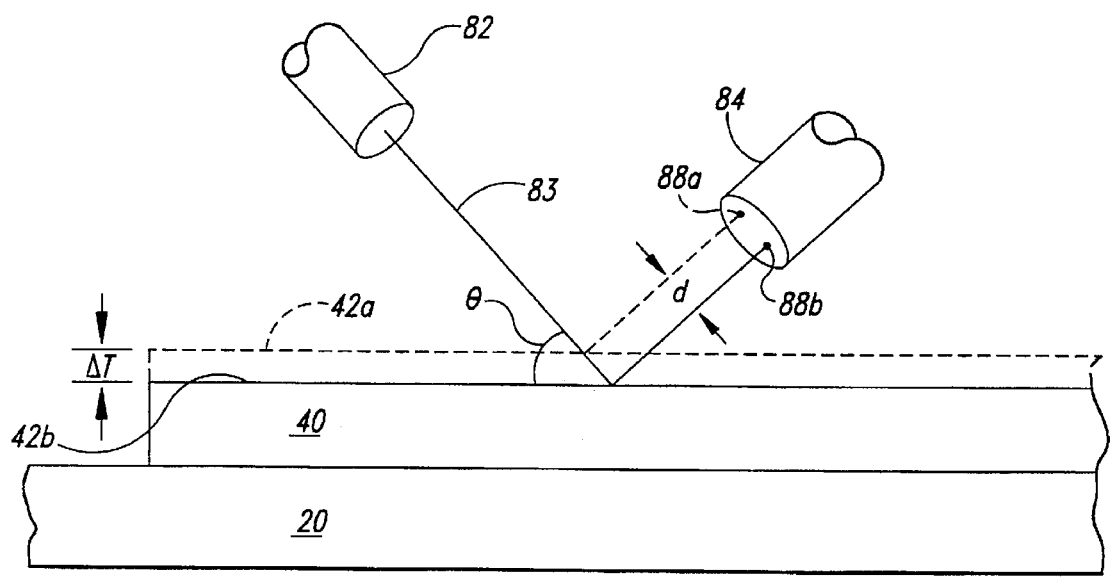
FIG. 8 is a schematic cross-sectional view of a measuring device for a chemical-mechanical planarization apparatus used in the method of FIG. 6.

FIG. 8 further illustrates a laser position sensor with a laser emitter 82 and a detector 84. The laser beam 83 initially reflects off the original planarizing surface 42(a) of the wafer 40 to an original detection point 88(a) on the detector 84. As the thickness of the pad 40 decreases because of conditioning, the surface of the pad 40 moves down to a subsequent planarizing surface 42(b). The distance between the original planarizing surface 42(a) and subsequent planarizing surface 42(b) is the change in thickness of the wafer 40 ($\Delta T$). The laser beam 83 reflects off the subsequent planarizing surface 42(b) and travels to a subsequent detection point 88(b) on the detector 84. The detection points 88(a) and 88(b) are separated by a distance "d." By knowing the angle of inclination θ of the laser beam 83 with respect to the surface of the pad 40 and the distance "d" between the detection points 88(a) and 88(b), the change in thickness $\Delta T$ of the pad 40 may be calculated as follows:

$$\Delta T = (d)\sin\theta.$$

When the pad is in a desired condition, the change in thickness of the pad 40 caused by reconditioning the pad may be used to estimate the polishing rate of the wafer 60 and, if necessary, adjust the planarization time. As discussed above with respect to FIG. 5, the polishing rate of a wafer and the changes in pad thickness per conditioning cycle are directly related to each other in a straight line relationship. When a pad is in its desired condition, therefore, the wafer polishing rate for a specific wafer may be accurately estimated by measuring the actual change in thickness of the pad after the wafer is conditioned. The estimated polishing rate is compared to the desired polishing rate, and if the estimated polishing rate is sufficiently different from the desired polishing rate, then the planarizing time is adjusted according to the estimated polishing rate. The present invention, therefore, provides a more accurate estimate of the planarization time and reduces the number of wafers that are re-polished after they have been measured at the estimated end-point.

The present invention also generally eliminates the condition of the pad from being the source of a change in the polishing rate. Since the present invention reconditions the pad to a desired condition after each wafer is planarized, it is highly unlikely that a pad reconditioned according to the present invention will be the source of a drop in the polishing rate.

Figure 9:
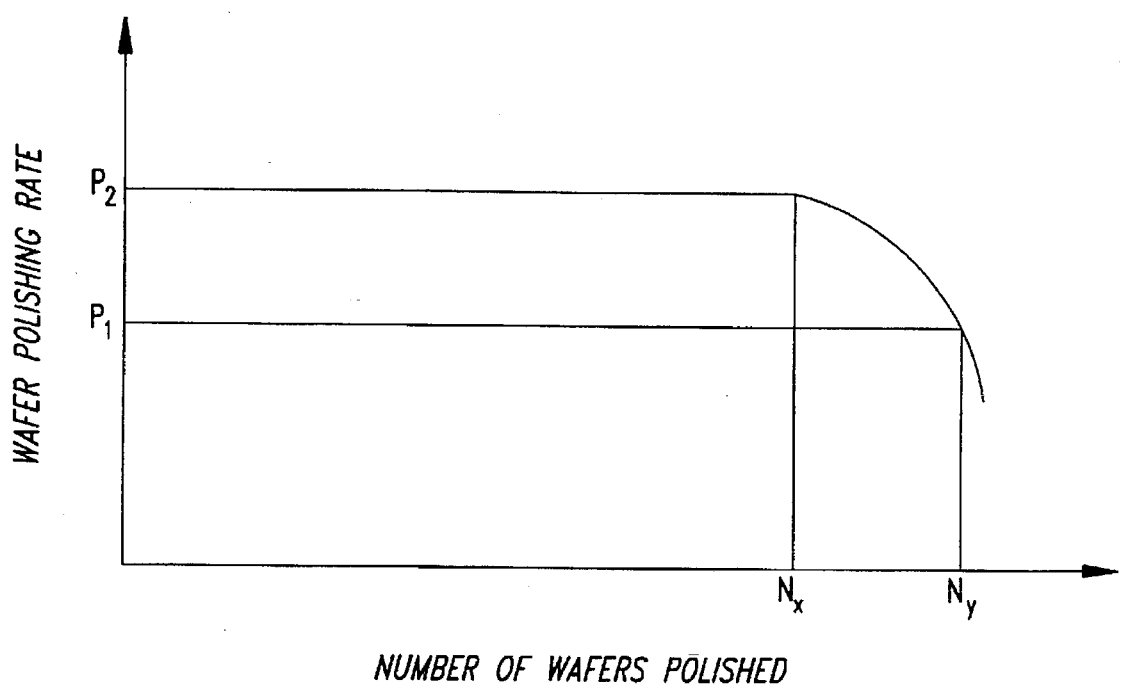
FIG. 9 is a diagram illustrating the polishing rate of a wafer.

Additionally, the wafer polisher 10 may also be used to identify whether or not the condition of the pad 40 is the source of a change in the polishing rate of the wafer. FIG. 9 illustrates an example of a typical change in the polishing rate in a CMP process. Up until the number of wafers polished equals $N_x$, the polishing rate of the wafers is constant at $P_2$ Å/s. After the number of wafers exceeds $N_x$, the polishing rate begins to drop off precipitously such that the polishing rate is equal to $P_1$ Å/s at $N_y$ wafers. The pad 40 can be isolated as the reason for the change in the polishing rate if the actual change in pad thickness, as measured by the planarizer 10 of the invention, corresponds to the estimated change in pad thickness as determined by the polishing rate. For example, once the polishing rate of the wafer 60 drops off at $N_y$ wafers, the change in thickness of the pad 40 after conditioning would be estimated to be $\Delta T_1$ μm according to the straight line correlation shown in FIG. 5. If the actual change in thickness of the pad 40 as measured by the wafer planarizer 10 is equal to $\Delta T_1$ μm, then the drop in the polishing rate was most likely due to the conditioning of the pad. If, however, the actual change in thickness of the pad 40 is not reasonably close to $\Delta T_1$ μm, then the actual change in thickness of the pad indicates that the pad 40 is still in good condition and is likely not the reason for the drop in the polishing rate. Therefore, the wafer planatizer 10 can also indicate whether or not the condition of the pad 40 is the source of a change in the polishing rate of the wafer 60.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method of selectively reconditioning a planarizing surface of a polishing pad used in chemical-mechanical planarization of substrates, the method comprising the steps of:

selecting a desired polishing rate based upon a set of operating parameters for a specific substrate;

estimating a desired change in pad thickness for reconditioning the pad to achieve the desired polishing rate based upon a predetermined correlation between substrate polishing rates and changes in pad thickness per conditioning cycle; and removing a layer of material from the planarizing surface having a thickness approximately equal to desired change in pad thickness to create a new planarizing surface.

2. The method of claim 1 wherein the removing step comprises micromachining the planarizing surface with a diamond-imbedded disk.

3. The method of claim 2 wherein the micromachining step comprises abrading the planarizing surface of the pad to a depth of at least 0.6 μm.

4. The method of claim 2 wherein the removing step further comprises abrading a layer of material having a uniform thickness across substantially all of the planarizing surface.

5. The method of claim 1 wherein the removing step is performed while a substrate is being polished.

6. A method of chemical-mechanical planarization of a substrate against a planarizing surface of a polishing pad, the method comprising the steps of:

selectively removing a layer of material having a desired thickness from the planarizing surface to achieve a desired substrate polishing rate based upon a predetermined relationship between substrate polishing rates and changes in pad thickness per conditioning cycle;

pressing the substrate against the planarizing surface of the polishing pad in the presence of a slurry; and moving at least one of the pad and the wafer with respect to the other.

7. The method of claim 6 wherein the removing step comprises micromachining the planarizing surface of the pad with a diamond-imbedded disk.

8. The method of claim 7 wherein the micromachining step comprises abrading the planarizing surface of the pad to a depth of at least 0.6 µm.

9. A method of chemical-mechanical planarization of a substrate against a planarizing surface of a polishing pad, the method comprising the steps of:

selectively removing a layer of material having a desired thickness from the planarizing surface to achieve a desired substrate polishing rate based upon a predetermined relationship between substrate polishing rates and changes in pad thickness per conditioning cycle;

measuring an actual change in pad thickness after the removing step;

estimating a polishing rate of the substrate based upon the actual change in pad thickness and the predetermined correlation between substrate polishing rates and changes in pad thickness per conditioning cycle;

comparing the desired polishing rate with the estimated polishing rate;

adjusting a planarizing time of the substrate in accordance with the estimated polishing rate when the estimated polishing rate is sufficiently different from the desired polishing rate;

pressing the substrate against the planarizing surface of the polishing pad in the presence of a slurry;

moving at least one of the pad and the substrate with respect to the other; and stopping the pressing and moving steps at the planarizing time.

10. The method of claim 9 wherein a substrate planarizer with a laser position sensor for determining a change in pad thickness is provided, the method further comprising engaging the pad with a laser beam and sensing a change in position of the laser beam with a detector.

11. A method of chemical-mechanical planarization of a substrate against a planarizing surface of a polishing pad, the method comprising the steps of:

selectively removing a layer of material having a desired thickness from the planarizing surface to achieve a desired substrate polishing rate based upon a predetermined relationship between substrate polishing rates and changes in pad thickness per conditioning cycle, the desired thickness being calibrated to provide a substantially constant substrate polishing rate over a plurality of substrates;

pressing the substrate against the planarizing surface of the polishing pad in the presence of a slurry; and moving at least one of the pad and the substrate with respect to the other.

12. A method of chemical-mechanical planarization of a semiconductor wafer against a planarizing surface of a polishing pad, the method comprising the steps of:

selectively removing at least a 0.6 µm layer of material from the planarizing surface of the polishing pad before the wafer is planarized to achieve a desired wafer polishing rate based upon a predetermined relationship between wafer polishing rates and changes in pad thickness per conditioning cycle;

pressing the wafer against the planarizing surface in the presence of a slurry; and moving at least one of the pad and the wafer with respect to the other.

13. A method of chemical-mechanical planarization of a substrate against a planarizing surface of a polishing pad, the method comprising the steps of:

selectively removing at least a 0.6 µm layer of material from the planarizing surface of the polishing pad before the substrate is planarized to achieve a desired substrate polishing rate based upon a predetermined relationship between substrate polishing rates and changes in pad thickness per conditioning cycle;

measuring an actual change in pad thickness after the removing step;

estimating a polishing rate of the substrate based upon the actual change in pad thickness and a predetermined correlation between substrate polishing rates and changes in pad thickness per conditioning cycle;

comparing the desired polishing rate with the estimated polishing rate;

adjusting a planarizing time of the substrate in accordance with the estimated polishing rate when the estimated polishing rate is sufficiently different from the desired polishing rate;

pressing the substrate against the planarizing surface in the presence of a slurry;

moving at least one of the pad and the substrate with respect to the other; and stopping the pressing and moving steps at the planarizing time.

14. The method of claim 13 wherein a wafer planarizer with a laser position sensor for determining a change in pad thickness is provided, the measuring step further comprising engaging the pad with a laser beam and sensing a change in position of the laser beam with a detector.

15. The method of claim 14 wherein the measuring device is a laser position sensor and the determining step comprises engaging the pad with a laser beam and sensing a change in position of the laser beam with a detector.

* * * * *